May 9, 1933.                H. C. DRAKE                1,907,755
RAIL FISSURE DETECTOR
Filed Aug. 15, 1930
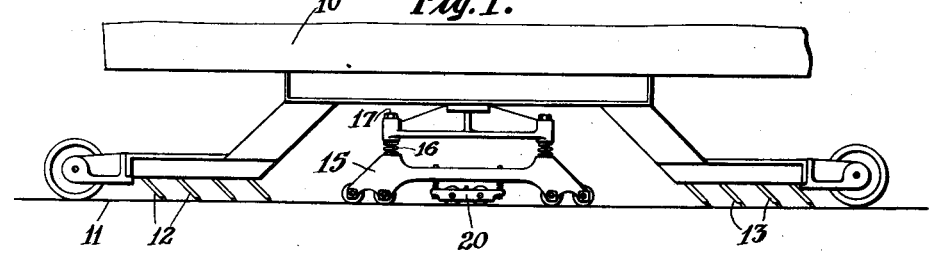
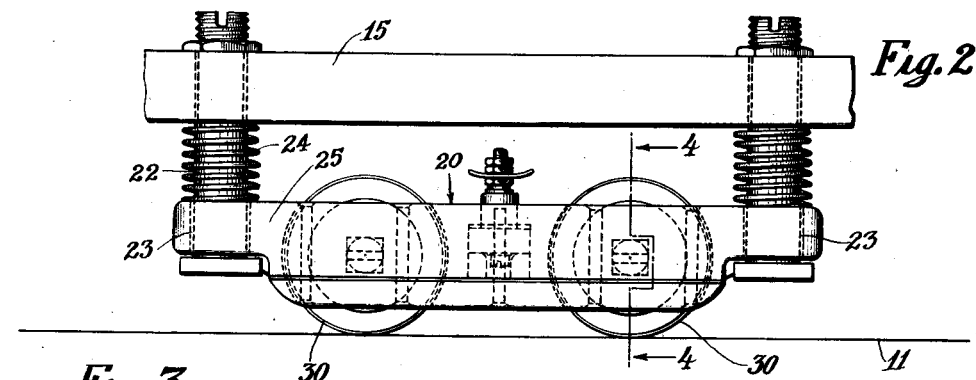
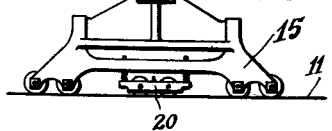
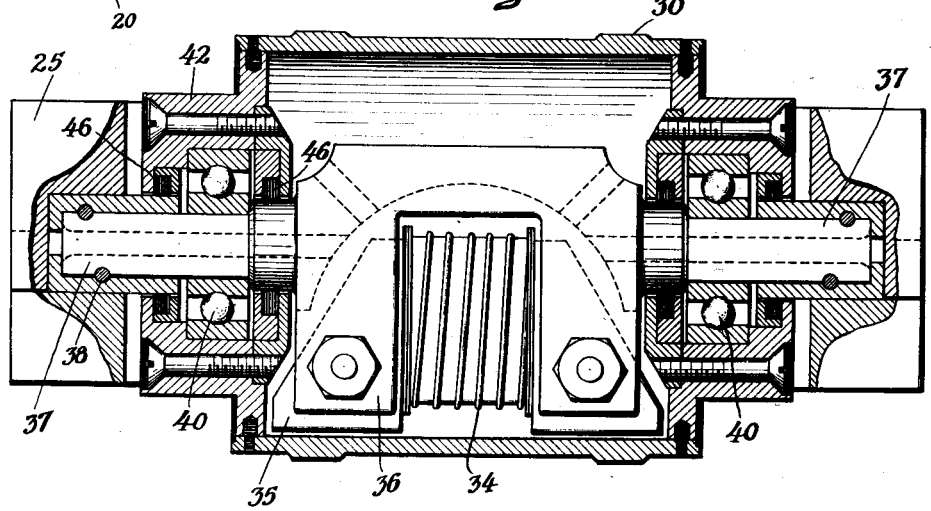
INVENTOR
*Harcourt C. Drake*
BY
ATTORNEY Patented May 9, 1933

1,907,755

UNITED STATES PATENT OFFICE

HARCOURT C. DRAKE, OF HEMPSTEAD, NEW YORK, ASSIGNOR TO SPERRY PRODUCTS, INC., OF BROOKLYN, NEW YORK, A CORPORATION OF NEW YORK

RAIL FISSURE DETECTOR

Application filed August 15, 1930. Serial No. 475,511.

This invention relates to improvements in rail fissure detectors of the type disclosed in the application of Elmer A. Sperry, Serial No. 298,771, filed August 10, 1928. The principle of such detectors consists in sending a heavy current through the rail or other metallic object to be tested, and detecting, through the medium of a moving carriage having detector coils mounted therein, variations in magnetic flux due to the presence of fissures or other defects. More particularly, this invention relates to the detector or pick-up unit which carries the detector coils and embodies a structure designed to overcome a difficulty in operation which has heretofore been experienced. This difficulty lies in the fact that rails frequently have uneven surfaces, particularly those caused by burns, and such unevennesses vary the distance between the detector coils and the rail surface, which show up as defects in the indicating mechanism. It is the principal object of my invention, therefore, to provide a detector or pick-up unit of such construction that the distance between the detector coils and the rail surface will always be constant regardless of such variations as those introduced by burns and similar irregularities in the rail surface.

In order to carry out this purpose I provide a mounting for the detector coils and for the members which actually contact with the rail surface, such that said contacting members and coils follow all the irregularities in the rail surface so as always to be parallel thereto and at a constant distance therefrom.

Other objects and advantages of this invention will become apparent in the following detailed description thereof.

In the accompanying drawing,

Fig. 1 is a side elevation of a portion of a flaw detecting mechanism, including the brushes for introducing current and the pick-up unit.

Fig. 2 is a side elevation of the pick-up unit per se in enlarged form.

Fig. 3 is a view of a modified form of carriage mounting.

Fig. 4 is a vertical section through one of the detecting coils and contact member, taken substantially on the line 4—4 of Fig. 2.

Referring to the drawing, I have disclosed in Fig. 1 only a portion of the flaw detector mechanism comprising the main support 10, which is adapted to be raised and lowered into and out of engagement with the rail surface 11 and carrying sets of brushes 12, 13, for leading current of high amperage into and out of the rail. Said main support also carries a detector carriage 15 which may be integral with the said support, as shown in Fig. 3, or may be resiliently connected thereto through the springs 16 and bolts 17, fitted loosely therein to form a limited universal connection for taking up the major irregularities between the detector mechanism and the rail.

Mounted on said carriage 15 is the detector or pick-up unit 20, shown in enlarged form in Fig. 2. Said detector unit may be mounted on said carriage 15 by means of bolts 22 extending loosely through openings 23 in the detector unit and springs 24 interposed between the carriage 15 and the detector frame 25. This limited universal connection is provided at each end of the detector unit so that said unit may follow all irregularities in the rail surface, such as those introduced by burns, and therefore maintain its plane at all times parallel to the plane of the rail surface at that particular point.

The detector unit consists of a pair of detector coils, each of which is provided with a non-magnetic contacting member 30, adapted to maintain contact with the rail surface at all times. Said contact members 30 are preferably in the form of cylinders or rollers mounted within the frame 25 of the detector unit in the manner hereinafter described, but it will be apparent that the contact member may be in some other form, such as a sliding shoe, for the broad purposes of this invention. Through the limited universal mountings hereinbefore described, the said contact members 30 are enabled to maintain their axes at all times at a fixed distance from the rail surface equal to the radius of the cylinder, regardless of the contour of the rail surface.

I have provided a mounting for the detector coils and the contact members 30 within the frame 25, of such nature that the position of said coils with respect to their contacting members is unchanged, so that there will be a relatively fixed gap between the rail surface and the electro-magnet of the detector coils.

Referring to Fig. 4, it will be seen that I have fixed within the frame 25 the electro-magnets 35 by means of supports 36, within which the magnets are mounted, the said supports 36 having trunnions 37 fixed within the frame 25 by means such as pins 38. Upon said trunnions 37 I provide bearings 40 for the cylindrical contact members 30. Each of said contact members comprises in addition to a cylindrical barrel, end members 42 which bear upon the said bearings 40 and also serve to enclose completely the magnets 35 and the coils 34. By introducing packing 46 adjacent the bearings 40, all possibility of dirt, moisture, and other foreign matter entering the detector coils is eliminated.

It will now be seen that by the structure described in the preceding paragraph, frame 25, the axis of contact member 30, and electro-magnet 34, 35 bear a fixed relation to each other regardless of the rotation of the cylinders 30. It will further be noted that the entire frame, contacting cylinders and detector coils align themselves as a unit with all irregularities on the rail surface, so that the distance between the ends of magnets 35 and the rail surface remains unchanged regardless of the contour of the rail surface.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a rail fissure detector, a current brush carriage, a detector unit comprising a detector coil and a contacting cylinder adapted to engage the rail, means for mounting said unit on said carriage whereby said cylinder follows the contour of the rail surface, and means whereby the coil is mounted in fixed relation to the cylinder axis to move therewith relative to the rail surface.

2. In a rail fissure detector, a detector unit comprising a detector coil and a contacting cylinder adapted to engage the rail, a mounting for said unit whereby said cylinder follows the contour of the rail surface, and means whereby the coil is mounted within said cylinder.

3. In a rail fissure detector, a detector unit comprising a detector coil and a contacting cylinder adapted to engage the rail, a mounting for said unit whereby said cylinder follows the contour of the rail surface, and means whereby the coil is mounted within said cylinder, said cylinder being provided with end walls for completely enclosing said coil.

4. In a rail fissure detector, a carriage, a detector unit mounted on said carriage to provide limited universal movement, said unit comprising a frame, an electro-magnet having trunnions whereby it is fixed in said frame, and a cylinder mounted for rotation on said trunnions and adapted to engage the rail surface.

5. In a rail fissure detector, a carriage, a detector unit mounted on said carriage to provide limited universal movement, said unit comprising a frame, an electro-magnet having trunnions whereby it is fixed in said frame, and a cylinder mounted for rotation on said trunnions and adapted to engage the rail surface, said cylinder having end members for completely enclosing said electro-magnet.

6. In a rail fissure detector, a carriage, a detector unit mounted on said carriage to provide limited universal movement, said unit comprising a frame, an electro-magnet having trunnions whereby it is fixed in said frame, and a cylinder mounted for rotation on said trunnions and adapted to engage the rail surface, said cylinder having end members for completely enclosing said electro-magnet, said end members bearing on said trunnions, and packing on said trunnions between said end members and said electro-magnet.

7. In a rail fissure detector, a detector unit comprising a plurality of detector coils and a plurality of contacting members engaging the rail, a mounting for said unit whereby said members follow the contour of the rail surface, and means whereby each of said coils and its respective contacting member move as a unit with respect to the rail surface.

8. In a rail fissure detector, a carriage, a detector unit mounted on said carriage to provide limited universal movement, said unit comprising a frame, a plurality of electro-magnets, each having a pair of trunnions whereby it is fixed in said frame, and a plurality of cylinders, one for each electro-magnet, mounted on said trunnions and adapted to engage the rail surface.

9. In a rail fissure detector a detector unit comprising a detector coil and a contacting cylinder adapted to engage the rail, and means whereby the coil is mounted in said cylinder in fixed relation to the cylinder axis to move therewith with respect to the rail surface.

10. In a rail fissure detector, a detector unit comprising a frame, an electro-magnet having trunnions whereby it is fixed in said frame, and a cylinder mounted for rotation on said trunnions and adapted to engage the rail surface.

11. In a rail fissure detector, a detector unit comprising a frame, a plurality of electro-magnets, each having trunnions whereby it is fixed in said frame, and a plurality of cylinders, one for each electro-magnet, mounted for rotation on said trunnions and adapted to engage the rail surface.

In testimony whereof I affix my signature.

HARCOURT C. DRAKE.